(12) United States Patent
Mayer et al.

(10) Patent No.: US 9,694,391 B1
(45) Date of Patent: Jul. 4, 2017

(54) ADJUSTABLE SPLIT WEIGHT GYRATORY SIFTER

(71) Applicant: M-I L.L.C., Houston, TX (US)

(72) Inventors: Marc D. Mayer, Hamilton, OH (US); Robert A. Lunnemann, Florence, KY (US)

(73) Assignee: M-I L.L.C., Houston, TX (US)

( * ) Notice: Subject to any disclaimer, the term of this patent is extended or adjusted under 35 U.S.C. 154(b) by 0 days.

(21) Appl. No.: 15/145,527

(22) Filed: May 3, 2016

(51) Int. Cl.
*B07B 1/28* (2006.01)
*F16C 3/28* (2006.01)

(52) U.S. Cl.
CPC ............. *B07B 1/284* (2013.01); *F16C 3/28* (2013.01)

(58) Field of Classification Search
CPC .. B07B 1/28; B07B 1/284; B07B 1/42; B07B 1/44; F16C 3/27
See application file for complete search history.

(56) References Cited

U.S. PATENT DOCUMENTS 4,107,035 A * 8/1978 Foresman ................ B07B 1/44
209/309

FOREIGN PATENT DOCUMENTS

GB 781514 A * 8/1957

* cited by examiner

*Primary Examiner* — Mark Beauchaine
(74) *Attorney, Agent, or Firm* — David J. Smith

(57) ABSTRACT

An apparatus includes a screen basket and a drive system coupled to the screen basket. The drive system includes a motor and a drive having a drive shaft. The drive system imparts a gyratory motion to the screen basket. First and second eccentric masses are coupled to the drive shaft. A method includes coupling the drive system to the screen basket of a sifter; the first eccentric mass positioned a distance above the second eccentric mass. The first and second eccentric masses are rotated together. The masses of the first and second eccentric masses are provided and/or adjusted so that a summation of forces generated by rotating the first and second eccentric masses generates a force line in plane with a center of gravity of the sifter. Rotation of the eccentric weights may move a distal end of a first and/or second weight arm a vertical distance upward.

16 Claims, 3 Drawing Sheets

ADJUSTABLE SPLIT WEIGHT GYRATORY SIFTER

BACKGROUND

Sifters and vibratory separators are used in a variety of applications for separating materials by size. For example, sifters and vibratory separators may be used to separate sized particles or to separate solids from liquids. These devices may be used to screen materials in various industries for industrial sorting, manufacturing operations, oil and gas drilling and production operations, etc.

Gyratory sifters are used in a variety of applications for separating solids by size. These applications include separating particles of sugar, flour, sand and various chemical powders. Gyratory sifters may be used for both wet and dry screening. Gyratory sifters include screens or perforated plates oriented generally horizontally, sloping from the head end (feed end) to the tail end (discharge end) of the sifter. The screens may be disposed in a screen basket. The screen basket may be suspended by a set of hangers that allow the basket to move on a horizontal plane. An eccentric drive mechanism, e.g., a belt driven eccentric weight, or other motive force is coupled to the screen basket to provide a circular motion substantially in a horizontal plane.

DETAILED DESCRIPTION

Figure 1:
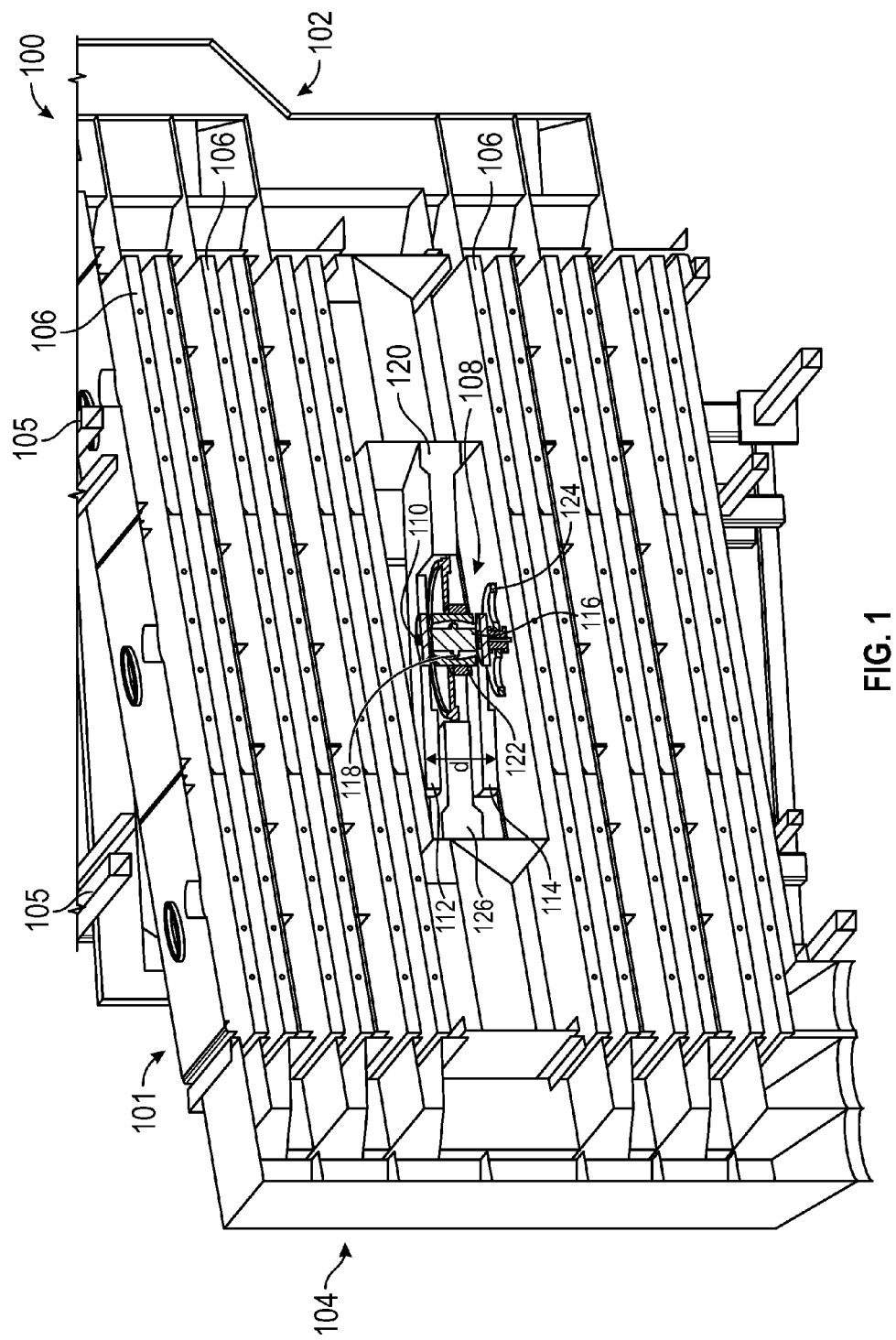
FIG. 1 is a cross-sectional view of a gyratory sifter in accordance with embodiments disclosed herein.

In one aspect, embodiments disclosed herein relate to an apparatus for sifting or separating sized particles. More specifically, embodiments disclosed herein relate to an apparatus for imparting a circular or elliptical motion to a screen basket. Embodiments disclosed herein relate to gyratory sifters which include a drive system that produces a reaction force that drives the screen basket through a circular or elliptical path in a horizontal plane. Although descriptions of a gyratory sifter are provided herein, one of ordinary skill in the art will appreciate that a drive system in accordance with embodiments disclosed herein may be coupled to other types of sifters and/or separators.

In another aspect, embodiments disclosed herein relate a gyratory sifter that includes a screen basket and a drive system coupled to the screen basket. The drive system includes a motor and a drive. The drive has a draft shaft to which two eccentric masses are separately coupled. The drive is coupled to the gyratory sifter such that the two eccentric masses rotate about the drive shaft in a horizontal plane, a first eccentric mass above a second eccentric mass.

In one or more embodiments, the drive, and in particular the first and second eccentric masses (collectively referred to herein as the swinging masses or rotating eccentric masses) are positioned proximate a center of the gyratory sifter. In some embodiments, the swinging masses may be positioned below screening surfaces of the gyratory sifter, above screening surfaces of the gyratory sifter, or between one or more screening surfaces of the gyratory sifter. In accordance with embodiments disclosed herein, the swinging masses are positioned proximate a center of gravity of the gyratory separator, such that the swinging masses rotate approximately around the center of gravity of the gyratory separator.

In accordance with embodiments disclosed herein, vertical motion of the vibratory sifter may be minimized to increase contact of material to be separated with the screening surface of the sifter. To increase contact of the material with the screen surface, and thereby increase efficiency of the sifter, motion of the sifter is maintained in a substantially horizontal gyration to move the material to be sifted from side to side and front to back along the screening surface(s). The movement of the sifter may be maintained in a substantially horizontal gyration (i.e., minimization of vertical motion of sifter) and may be accomplished by aligning a force line of the drive with a plane of the center of gravity of the sifter. More specifically, as discussed in greater detail below, a drive may be provided or adjusted such that when the swinging masses are driven by the drive shaft, the summation of the forces of the two eccentric masses results in a force line in plane with the center of gravity of the sifter. By aligning the force line of the rotating eccentric masses with the center of gravity of the sifter, torque on the sifter may be reduced or eliminated and vertical motion of the sifter may therefore be reduced or eliminated.

Further, embodiments disclosed herein provide a sifter that allows for the force line of the rotating eccentric masses to be adjusted. Specifically, in accordance with one or more embodiments disclosed herein, a mass of the first eccentric mass and/or a mass of the second eccentric mass may be adjusted (increased or reduced) to move the resultant force line of the rotating eccentric masses a vertical distance. Thus, should the center of gravity of the sifter move, due to, for example, increased weight of equipment or material in or coupled to the sifter, the mass of one or both of the rotating eccentric masses may be adjusted to move the resultant force line to correspond with (be in plane with) the center of gravity of the sifter.

In yet another aspect, embodiments disclosed herein relate a drive system coupled to a gyratory sifter such that the two eccentric masses rotate about a drive shaft in a horizontal plane, a first eccentric mass above a second eccentric mass. Each mass is coupled to weight arm coupled to the drive shaft. The mass of the first and/or second eccentric masses may be sufficient to displace the first and/or second eccentric masses (and therefore a distal end of first and/or second weight arms), such that the eccentric masses are offset from horizontal. The weight of the first offset mass and the second offset mass may produce large axial and downward rotational loads on the first and second weight arm and the drive shaft, which may cause undue vibration in the sifter and reduce the life of a bearing assembly coupled to the drive shaft. Thus, in accordance with one or more embodiments disclosed herein, the mass of the two eccentric masses may be selected so that as the eccentric masses are rotated about the drive shaft, the resultant centrifugal force and upward torque generated counteracts a downward force of the weight of the two eccentric masses and the rotational moment imparted on the gyratory sifter.

More specifically, and as discussed in more detail below, a first offset mass of a first weight arm is positioned proximate a distal end (an end opposite an end coupled to the drive shaft) of the first weight arm and a second offset mass of a second weight arm is positioned proximate a distal end of the second weight arm. The mass of the first eccentric mass and the mass of the second eccentric mass are selected such that when the drive is off or not in operation, i.e., when the weight arms and eccentric masses are at rest, the eccentric masses displaces a distal end of the first weight arm and second weight arm, respectively, a vertical distance downward. In other words, at rest, the first and second eccentric masses are offset in a downward position from a horizontal position. When the first and second weight arms are rotated about the drive shaft, the resultant centrifugal force and upward torque move the displaced or offset distal ends of the first and second weight arms a vertical distance that is approximately equal to and opposite the vertical distance the eccentric masses displaced the distal ends of the first and second weight arms at rest. Thus, when the first and second weight arms are rotated, in accordance with embodiments disclosed herein, the weight arms extend radially from the drive shaft in a substantially horizontal or planar position.

Referring now to FIG. 1, a gyratory sifter 100 in accordance with embodiments disclosed herein is shown in cross-section. As shown, the gyratory sifter 100 includes a screen basket 101 and extends from a first end 102 (i.e., a feed end) to a second end 104 (i.e., a discharge end). A system of hangers 105 may be coupled to the screen basket 101 to support the screen basket and enable the screen basket to move in a circular or elliptical path in a horizontal plane. The gyratory sifter 100 may include one or more screening surfaces 106 disposed in the screen basket 101. In accordance with one or more embodiments, each screening surface 106 may include a ball box (not shown) having a screening material or mesh disposed or tensioned over the ball box. The screening surface(s) 106 may be positioned within the screen basket one above the other. Sized particles are retained on the screening surface(s) 106, the screening surface(s) having openings or apertures of a predetermined size. In some embodiments, the screening surface(s) may separate or sift the material to be separated in series. In other embodiments, the screening surface(s) may separate or sift the material to be separated in parallel. Although the gyratory separator 100 shown in FIG. 1 shows twelve screening surfaces, one of ordinary skill in the art will appreciate that fewer or more screening surfaces may be included in the screen basket 101.

Gyratory motion is imparted to the screen basket by a drive system 108. Gyratory motion provided by the drive system 108 moves the material on the screening surface(s) from front to back and side to side. The drive system 108 includes a motor (not shown) and a drive 110. As shown, drive 110 includes two eccentric masses, a first eccentric mass 112 and a second eccentric mass 114, coupled to a drive shaft 116. The drive 110 may be belt driven, such that a belt (not shown) may be coupled between the motor (not shown) and a pulley 124 coupled to the drive shaft 116. The drive 110 also includes a bearing assembly 118 coupled to the drive shaft 116. As shown, the drive shaft 116 is oriented generally vertically within the screen basket 101. The first and second eccentric masses 112, 114 are coupled to the drive shaft 116 and oriented horizontally, generally perpendicular to the drive shaft 116. The first eccentric mass 112 is positioned above the second eccentric mass 114 and spaced apart from the second eccentric mass 114 a vertical distance. In other words, the drive 110 includes a "split-weight." The drive 110 may be positioned below the screening surface(s) 106, above the screening surface(s) 106, or as shown in FIG. 1, the drive 108 may be positioned between screening surface(s) 106. In accordance with embodiments disclosed herein, the drive 110 is positioned proximate a center of gravity of the sifter 100, and more particularly, the screen basket 101.

The drive 110 may be coupled to the screen basket 101 by any means known in the art. In one embodiment, the one or more support structures 120 may extend from a surface of the screen basket 101 to a component of the drive 110. For example, a support structure 120 may extend from a surface of the screen basket to a drive housing 122 of the drive 110. In some embodiments, the drive housing 122 may house the bearing assembly 118. In the embodiment shown in FIG. 1, the support structures 120 may extend horizontally from a wall of the screen basket 101 and couple to the drive housing 122. The support structures 120 for the drive 110 may be positioned such that the support structures 120 "split" the first and second eccentric masses 112, 114. As shown, the first eccentric mass 112 is positioned above the support structures 120 and the second eccentric mass 114 is positioned below the support structures 120. Such a configuration may more evenly distribute stresses caused during rotation of the swinging masses on the screen basket. Additionally, splitting the eccentric mass into the first and second eccentric masses 112, 114 aligns the swinging masses with a plane of the bearing assembly 118.

Figure 2:
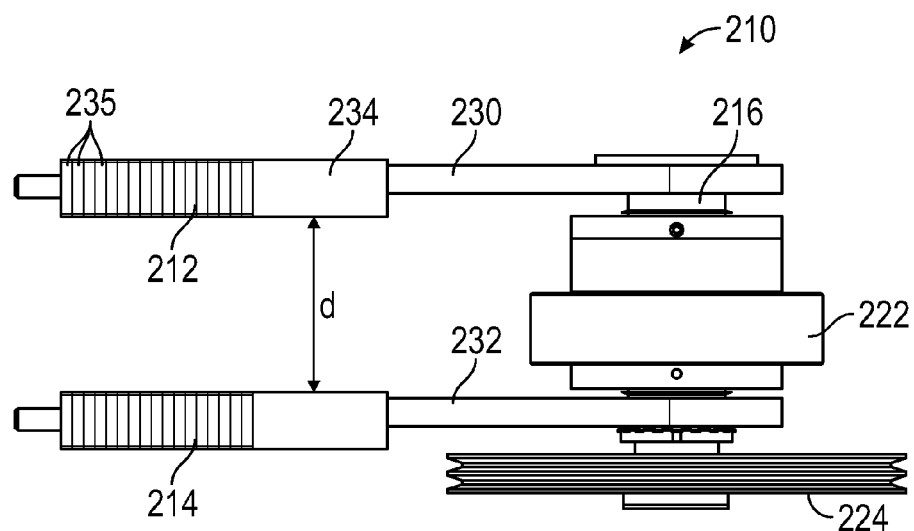
FIG. 2 is a perspective view of a drive having two eccentric masses in accordance with embodiments disclosed herein.

Referring now to FIG. 2, a perspective view of a drive 210 similar to that shown in FIG. 1 is shown in accordance with embodiments disclosed herein. A shown, drive 210 includes a drive shaft 216 at least partial disposed within a drive housing 222. A bearing assembly (not shown) may be disposed around the drive shaft 216 within the drive housing 222. A first eccentric mass 212 is coupled to a first end of the drive shaft 216 and a second eccentric mass 214 is coupled to a second end of the drive shaft 216. As shown, the first and second eccentric masses 212, 214 may be coupled to a distal end of a first weight arm 230 and a second weight arm 232, respectively. The first weight arm 230 and the second weight arm 232 are, in turn, coupled to the first end and the second end of the drive shaft 216. The drive 210 also includes a pulley 224 operatively coupled to the second end of the drive shaft 216 and about which a belt (not shown) is looped for coupling the pulley 224 (and therefore the drive shaft 216) to a motor (not shown) of a drive system.

When installed in a sifter, the drive shaft 216 is generally oriented vertically, as shown in FIGS. 1 and 2. The first and second weight arms 230, 232, and therefore the first and second eccentric masses 212, 214 extend generally horizontally from, i.e., perpendicularly to, the drive shaft 216 and are spaced apart a distance d. As show in FIG. 2, the first and second eccentric masses 212, 214 may include one or more individual masses. For example, first eccentric mass 212 may include a single mass 234 and/or one or more weight plates 235. In some embodiments, the first and/or second eccentric masses 212, 214 may include a plurality of plates 235 that may be added or removed from the first and/or second weight arms 230, 232, respectively. For example, one or more weight plates 235 may be slid onto or off of a distal end of the first and/or second weight arms 230, 232. By adding or removing weight plates 235 to the first and/or second weight arms 230, 232, a mass of the first and/or second eccentric masses 212, 214 may be adjusted. Adjustment of the mass of the first and/or second eccentric masses 212, 214 may adjust a resultant force or "force line" (i.e., a summation of the forces generated by the first and second eccentric masses 212, 214 as they are rotated by the drive shaft 216), as discussed in detail below.

Figure 3:
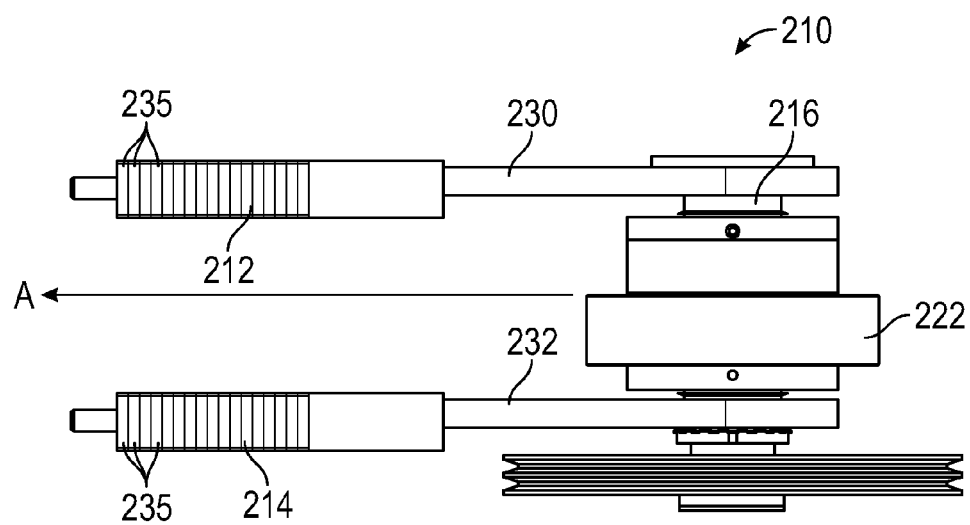
FIG. 3 is a perspective view of the drive of FIG. 2, wherein the drive includes two equal eccentric masses in accordance with embodiments disclosed herein.

Referring now to FIG. 3, a perspective of the drive 210 of FIG. 2 is shown having a first resultant force indicated by arrow A. As discussed above, the drive shaft 216 rotates and causes the first and second weight arms 212, 214 (and first and second eccentric masses 212, 214) to rotate together about the drive shaft 216. Rotation of the first and second weight arms 212, 214 (and first and second eccentric masses 212, 214) generates a centrifugal force that imparts a circular or elliptical motion to the screen basket (101, FIG. 1). A summation of the forces of the first and second weight arms 212, 214 (and first and second eccentric masses 212, 214) yields a first resultant force illustrated by a force line, indicated at arrow A. As shown in FIG. 3, the first eccentric mass 212 is approximately equal to the second eccentric mass 212. Therefore, the force line, indicated at arrow A, is located approximately equidistantly between the first and second eccentric masses 212, 214.

In accordance with embodiments disclosed herein, the drive 210 is positioned within the gyratory sifter (100, FIG. 1) such that the force line indicated at arrow A is in plane with a center of gravity of the gyratory sifter (100, FIG. 1). Alignment of the force line of the first and eccentric masses 212, 214 with the plane of the center of gravity of the sifter (or screen basket (101, FIG. 1)), reduces a torque generated by the swinging masses and minimizes vertical motion and/or vibration of the screen basket (101, FIG. 1).

Once the drive 210 is installed within a gyratory sifter, the force line of the first and second eccentric masses 212, 214 may be adjusted vertically upward or downward if the center of gravity of the sifter or screen basket changes. For example, if additional equipment is coupled to screen basket, the number of screens are increased or reduced, etc., then the force line of the swinging weights may be adjusted so that the force line remains in line with the center of gravity of the sifter (screen basket). The force line of the swinging weights may be shifted vertically upward or downward by adjusting a mass of one or both of the first and second eccentric masses 212, 214.

Figure 4:
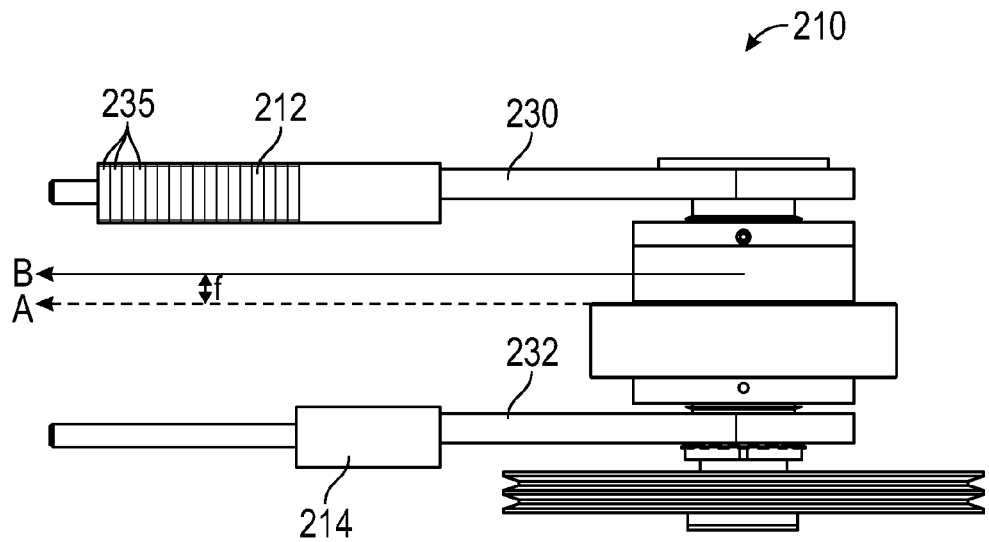
FIG. 4 is a perspective view of the drive of FIG. 3, wherein a resultant force of the two eccentric weights is shifted by a change in mass of one of the eccentric masses in accordance with embodiments disclosed herein.

Referring now to FIG. 4, the force line of the drive 210 is shown shifted vertically upward, i.e., closer to the first eccentric mass 212, as indicated by arrow B. Specifically, the force line of the drive 210 is shown shifted or moved a vertical distance f from an original force line indicated by the dotted arrow A, which corresponds to the force line shown in FIG. 3 wherein the mass of the first eccentric mass 212 was approximately equal to the mass of the second eccentric mass 214. According to embodiments disclosed herein, to accomplish this shift in the force line of the first and second eccentric masses 212, 214, the mass of the first and/or second eccentric masses 212, 214 may be adjusted by adding or removing mass.

For example, if the center of gravity of the sifter or screen basket is shifted vertically upward, the force line (resultant force) of the first and second eccentric masses 212, 214 maybe moved vertically upward so that the force line is in plane with the center of gravity of the sifter/screen basket. Specifically, as shown in FIG. 4, in some embodiments a plurality of weight plates 235 (see also FIG. 3) may be removed from the second weight arm 232, such that the mass of the first eccentric mass 212 is greater than the mass of the second eccentric mass 214. In other embodiments, additional weight plates 235 may be added to the first weight arm 230, such that the mass of the first eccentric weight 212 is greater than the mass of the second eccentric mass 214. Accordingly, the center of gravity of the swinging weights 212, 214 is shifted vertically upward. The amount of weight added or removed from one or both of the first and second weigh arms 230, 232 corresponds to the distance f that the force line needs to shift so that the force line is in line with the plane of the center of gravity of the sifter/screen basket.

Conversely, the force line of the first and second eccentric masses 212, 214 may be shifted vertically downwards by adjusting the mass of one or both of the first and second eccentric masses 212, 214 such that the mass of the second eccentric mass 214 is greater than the first eccentric mass 212. Thus, if the center of gravity of sifter or screen basket changes to a location vertically below an initial center of gravity due to, for example, changes to equipment in or coupled to the screen basket or material therein, the force line of the first and second eccentric masses 212, 214 may be shifted vertically downward a similar amount.

In other words, in accordance with embodiments disclosed herein, a mass of the first and/or second eccentric masses 212, 214 of a gyratory sifter may be adjusted to move a force line of the first and second eccentric masses 212, 214 a vertical distance that corresponds to a change in vertical distance of the center of gravity of the sifter or screen basket.

Figure 5:
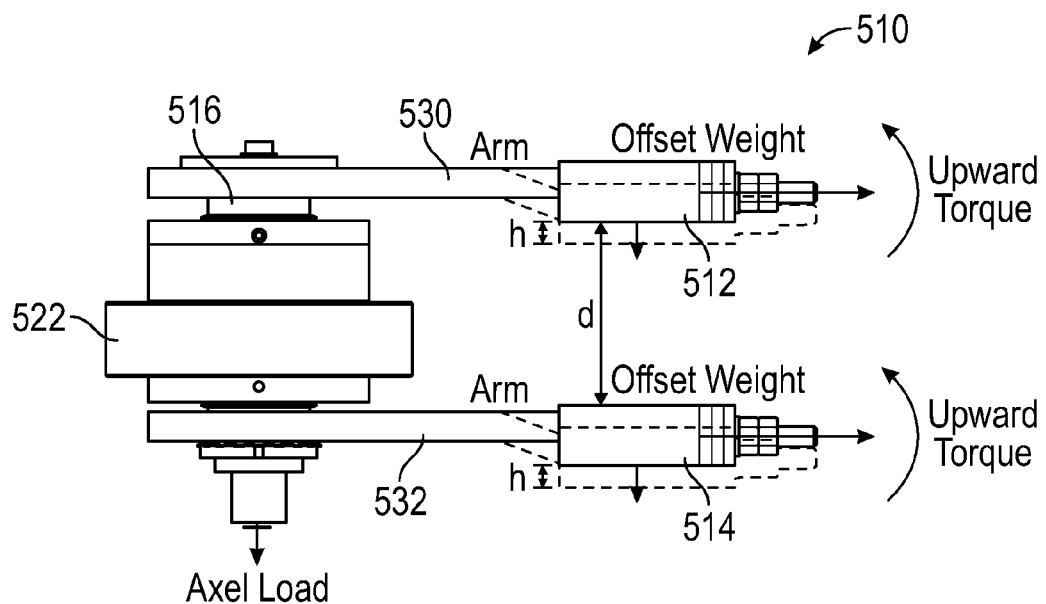
FIG. 5 is a schematic of a drive having two eccentric masses in accordance with embodiments disclosed herein.

Referring now to FIG. 5, a schematic of a drive 510 for a gyratory sifter according to embodiments of the present disclosure is shown. Similar to the drives discussed above, drive 510 includes a drive shaft 516 at least partially disposed within a drive housing 522. As shown, the drive shaft 516 is generally vertically oriented within a screen basket (101, FIG. 1). A bearing assembly (not shown) may be disposed around the drive shaft 516 within the drive housing 522. A first weight arm 530 is coupled to a first end of the drive shaft 516 and a second weight arm 532 is coupled to a second end of the drive shaft 516. The first weight arm 530 and the second weight arm 532 are spaced apart a distance d, wherein the first weight arm 230 is positioned above the second weight arm 532. The first weight arm 530 includes a first eccentric mass 512 proximate a distal end of the first weight arm 230, and the second weight arm 532 is includes a second eccentric mass 512 proximate a distal end of the second weight arm 532. The drive 510 may also include a pulley (not shown) operatively coupled to an end of the drive shaft 516 and about which a belt (not shown) may be looped for coupling the pulley (and therefore the drive shaft 516) to a motor (not shown) of a drive system.

The mass of the first and/or second eccentric masses 512, 514 may be sufficient to vertically displace the first and/or second eccentric masses 512, 514 (and therefore a distal end of first and/or second weight arms 530, 532). In other words, the mass of the first and/or eccentric masses 512, 514 may cause the first and/or second weight arms 530, 532 to flex downward, such that a distal end of the first and/or second weight arm 530, 532 is displaced a vertical distance downward from an initial horizontal position (if the first and/or second weight arm 530, 532 did not include an eccentric mass). Thus, when the first and/or second eccentric masses 512, 514 (and first and/or second weight arms 530, 532) are at rest (i.e., when the drive is off or not running), the eccentric masses 512, 514 are "offset" from a horizontal position.

In accordance with one or more embodiments disclosed herein, the mass of the two eccentric masses 512, 514 may be selected so that as the eccentric masses 512, 514 are rotated about the drive shaft 516, the resultant centrifugal force and upward torque generated counteracts a downward force of the weight of the two eccentric masses 512, 514 and the rotational moment imparted on the gyratory sifter. More specifically, a first eccentric mass 512 of a first weight arm 530 is positioned proximate a distal end (an end opposite an end coupled to the drive shaft 516) of the first weight arm 530 and a second eccentric mass 514 of a second weight arm 532 is positioned proximate a distal end of the second weight arm 532. The mass of the first eccentric mass 512 and the mass of the second eccentric mass 514 are selected such that when the drive is off or not in operation (i.e., when the weight arms 530, 532 and eccentric masses 512, 514 are at rest) the eccentric masses 512, 514 displaces a distal end of the first weight arm 530 and second weight arm 532, respectively, a vertical distance h downward. In other words, at rest, the first and second eccentric masses 512, 514 are offset in a downward position from a horizontal position. When the first and second weight arms 530, 532 are rotated by the drive shaft 516, the resultant centrifugal force and upward torque move the displaced or offset distal ends and offset eccentric masses 512, 514 of the first and second weight arms 530, 532 a vertical distance that is approximately equal to and opposite the vertical distance the eccentric masses 512, 514 displaced the distal ends of the first and second weight arms 530, 532 at rest. Thus, when the first and second weight arms 530, 532 are rotated, in accordance with embodiments disclosed herein, the weight arms 530, 532 extend radially from the drive shaft in a substantially horizontal or planar position. In other words, as the weight arms 530, 532 and offset masses 512, 514 are rotated about the drive shaft 516, they produce a centrifugal force and an upward torque that cancels the downward force of the weight and the rotational moment imparted on the sifter/screen basket. This balance of forces may reduce the axial load on the bearing assembly (not shown) of the drive 510, thereby extending the life of the bearing assembly. Additionally, the balance of forces may reduce unwanted vibrations in the screen basket and support structures, such as a system of hangers of the screen basket.

In accordance with one or more embodiments disclosed herein, a method may include coupling a drive system to a screen basket of a sifter, the drive system having a motor and a drive, as discussed above. The drive system imparts a gyratory motion to the screen basket. Specifically, the drive includes a first eccentric mass and a second eccentric mass coupled to a generally vertical drive shaft. The method further includes rotating the first eccentric mass and the second eccentric mass together, the first eccentric mass positioned a distance above the second eccentric mass. The method also includes providing the first eccentric mass with a first mass and the second eccentric mass with a second mass, such that a summation of the forces generated by rotating the first eccentric mass and the second eccentric mass generates a force line in plane with a center of gravity of the sifter. The method may further include adjusting the mass of at least one of the first eccentric mass and the second eccentric mass to move the force line in a vertical direction. The adjusting the mass may include adding or removing one or more weight plates from at least one of a first weight arm or a second weight arm.

In accordance with embodiments disclosed herein, a change of the center of gravity of the sifter may be determined and the mass of the second eccentric mass may be decreased to shift the force line of the first and second eccentric masses a vertical distance upward. In other embodiments, the mass of the first eccentric mass may be decreased to shift the force line of the first and second eccentric masses a vertical distance downward to correspond with the determined change in the center of gravity of the sifter.

In one or more embodiments, a method includes providing a drive system to a screen basket of a sifter, the drive system having a motor and a drive as described above. Specifically, the drive includes a vertical drive shaft, a first weight arm coupled to the drive shaft, the first weight arm having a first offset mass proximate a distal end of the first weight arm, and a second weight arm coupled to the drive shaft axially below the first weight arm, the second weight arm having a second offset mass proximate a distal end of the first weight arm. The method further includes providing a mass of the first offset mass such that a distal end of the first weight arm flexes a vertical distance downwards and providing a mass of the second offset mass such that a distal end of the second weight arm flexes a vertical distance downwards. Additionally, the method includes actuating the motor and rotating the vertical drive shaft and the first and second weight arms, the rotating the vertical drive shaft causing the distal end of the first weight arm and the distal end of the second weight arm to move a vertical distance upwards. In accordance with embodiments disclosed herein, the method may include rotating the vertical drive shaft at a speed such that a centrifugal force and upward torque created by the first and second weight arms rotating substantially cancels the downward force of a weight of the first and second offset masses and the rotational moment imparted on the sifter and/or screen basket.

In some embodiments, the vertical distance upwards is approximately equally to the vertical distance downwards. Further, in some embodiments, at least one of the first weight arm or the second weight arm is in a substantially horizontal plane when rotating about the vertical drive shaft. In accordance with embodiments disclosed herein, the method may also include locating the drive system proximate a center of gravity of the sifter and/or screen basket. Further, in some embodiments, the method includes adjusting a resultant force or force line of the offset weights to be in line with a plane of the center of gravity of the sifter and/or screen basket.

While the present disclosure has been described with respect to a limited number of embodiments, those skilled in the art, having benefit of the present disclosure will appreciate that other embodiments may be devised which do not depart from the scope of the disclosure described herein. Accordingly, the scope of the disclosure should be limited only by the claims appended hereto.

What is claimed:
1. An apparatus comprising:
   a screen basket;
   a drive system coupled to the screen basket, the drive system comprising:
      a motor; and
      a drive having a drive shaft, a first eccentric mass coupled the drive shaft and a second eccentric mass coupled to the drive shaft,
      wherein at least one selected from
         the drive system is disposed proximate a center of gravity of the apparatus,
         a summation of forces generated by rotation of the first eccentric mass and the second eccentric mass provides a force line in plane with a center of gravity of the apparatus, and
         the first eccentric mass is coupled to a first weight arm, the first weight arm coupled to the drive shaft, the second eccentric mass is coupled to a second weight arm, the second weight arm coupled to the drive shaft, and a mass of the first eccentric mass displaces a distal end of the first weight arm a vertical distance.

2. The apparatus of claim 1, wherein a mass of at least the second eccentric mass is adjustable.

3. The apparatus of claim 1, wherein the drive shaft is oriented generally vertically and the first eccentric mass is positioned above the second eccentric mass.

4. The apparatus of claim 1, wherein the first eccentric mass is greater than the second eccentric mass.

5. The apparatus of claim 1, wherein the vertical distance is equal and opposite to a vertical displacement of the distal end of the first weight arm when the first weight arm rotates about the drive shaft.

6. A method comprising:
coupling a drive system to a screen basket of a sifter, the drive system comprising a motor and a drive, the drive having a first eccentric mass and a second eccentric mass coupled to a generally vertical drive shaft, the first eccentric mass positioned a distance above the second eccentric mass;
rotating the first eccentric mass and the second eccentric mass together; and
providing the first eccentric mass with a first mass and the second eccentric mass with a second mass, such that a summation of the forces generated by rotating the first eccentric mass and the second eccentric mass generates a force line in plane with a center of gravity of the sifter.

7. The method of claim 6, further comprising adjusting the mass of at least one of the first eccentric mass and the second eccentric mass to move the force line in a vertical direction.

8. The method of claim 7, wherein the adjusting the mass comprises adding or removing one or more weight plates from at least one of a first weight arm or a second weight arm.

9. The method of claim 6, further comprising:
determining a change of the center of gravity of the sifter; and
decreasing the mass of the second eccentric mass and shifting the force line of the first and second eccentric masses a vertical distance upward.

10. The method of claim 9, wherein the vertical distance is approximately equal to the change of the center of gravity of the sifter in a vertical direction.

11. The method of claim 6, further comprising:
determining a change of the center of gravity of the sifter; and
decreasing the mass of the first eccentric mass and shifting the force line of the first and second eccentric masses a vertical distance downward to correspond with the change in the center of gravity of the sifter.

12. A method comprising:
providing a drive system to a screen basket of a sifter, the drive system comprising a motor and a drive, the drive having a vertical drive shaft, a first weight arm coupled to the drive shaft, the first weight arm having a first offset mass proximate a distal end of the first weight arm, and a second weight arm coupled to the drive shaft axially below the first weight arm, the second weight arm having a second offset mass proximate a distal end of the second weight arm;
providing a mass of the first offset mass such that a distal end of the first weight arm flexes a vertical distance downwards and providing a mass of the second offset mass such that a distal end of the second weight arm flexes a vertical distance downwards; and
actuating the motor and rotating the vertical drive shaft and the first and second weight arms, the rotating the vertical drive shaft causing the distal end of the first weight arm and the distal end of the second weight arm to move a vertical distance upwards.

13. The method of claim 12, wherein the vertical distance upwards is approximately equal to the vertical distance downwards.

14. The method of claim 12, wherein at least one of the first weight arm or the second weight arm is in a substantially horizontal plane when rotating about the vertical drive shaft.

15. The method of claim 12, further comprising locating the drive system proximate a center of gravity of the sifter.

16. The method of claim 12, further comprising rotating the vertical drive shaft at a speed such that a centrifugal force and upward torque created by the first and second weight arms rotating substantially cancels the downward force of a weight of the first and second offset masses and the rotational moment imparted on the sifter.

* * * * *